(12) United States Patent
Elzein

(10) Patent No.: US 10,813,142 B2
(45) Date of Patent: Oct. 20, 2020

(54) APPARATUS OF PAGING MOBILE DEVICES

(71) Applicant: Ford Global Technologies, LLC, Dearborn, MI (US)

(72) Inventor: Hadi Elzein, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1734 days.

(21) Appl. No.: 14/052,014

(22) Filed: Oct. 11, 2013

(65) Prior Publication Data

US 2015/0105018 A1 Apr. 16, 2015

(51) Int. Cl.
  *H04B 7/00* (2006.01)
  *H04W 76/10* (2018.01)
  *H04W 4/80* (2018.01)

(52) U.S. Cl.
  CPC .......... *H04W 76/10* (2018.02); *H04W 4/80* (2018.02)

(58) Field of Classification Search
  CPC ......................... H04M 2207/18; H04B 1/3822
  USPC .................................................. 455/41.1–41.2
  See application file for complete search history.

(56) References Cited

U.S. PATENT DOCUMENTS

| | | | |
|---|---|---|---|
| 7,376,442 B2 * | 5/2008 | Yoshioka | G06F 9/4843 455/556.2 |
| 7,516,201 B2 | 4/2009 | Kovacs et al. | |
| 8,024,487 B2 | 9/2011 | Bhanu et al. | |
| 8,260,977 B2 * | 9/2012 | Terauchi | H04L 12/2807 710/15 |
| 9,736,622 B2 * | 8/2017 | Ota | H04W 76/19 |
| 9,736,764 B2 * | 8/2017 | Seymour | H04W 48/16 |
| 2006/0079227 A1 * | 4/2006 | Barrow | H04W 8/245 455/433 |
| 2006/0229014 A1 * | 10/2006 | Harada | H04M 1/7253 455/41.2 |
| 2007/0081506 A1 | 4/2007 | Yamada | |
| 2010/0097239 A1 * | 4/2010 | Campbell | B60R 11/0252 340/4.4 |
| 2010/0304745 A1 * | 12/2010 | Patel | H04W 52/143 455/435.1 |
| 2011/0063094 A1 * | 3/2011 | Meiertoberens | A61M 5/14244 340/12.5 |
| 2011/0224870 A1 * | 9/2011 | Tan | H04M 1/6091 701/36 |

(Continued)

FOREIGN PATENT DOCUMENTS

| | | |
|---|---|---|
| CN | 101340212 A | 1/2009 |
| WO | 2013/039763 | 3/2013 |

*Primary Examiner* — Ankur Jain
*Assistant Examiner* — Max Mathew
(74) *Attorney, Agent, or Firm* — Michael Spenner; Brooks Kushman P.C.

(57) ABSTRACT

A vehicle computer system (VCS) configured to communicate with one or more mobile devices, comprising a first processor configured to automatically create a priority list by utilizing one or more factors associated with communication activity between the vehicle computer system and the one or more mobile devices, wherein the priority list includes instructions to pair one or more mobile devices with the VCS and indicates the order of connecting to the one or more mobile devices. The vehicle computer system also includes a wireless transceiver including a second processor configured to receive the priority list from the first processor and establish a wireless connection with one or more mobile devices based on the priority list.

2 Claims, 3 Drawing Sheets

(56) References Cited

U.S. PATENT DOCUMENTS

| | | | |
|---|---|---|---|
| 2012/0161927 A1* | 6/2012 | Pierfelice | H04W 76/14 340/5.83 |
| 2013/0065523 A1* | 3/2013 | Yun | H04M 1/7253 455/41.1 |
| 2013/0157711 A1* | 6/2013 | Lee | H04W 48/18 455/525 |
| 2016/0345334 A1* | 11/2016 | Veerepalli | H04W 48/08 |

* cited by examiner

APPARATUS OF PAGING MOBILE DEVICES

TECHNICAL FIELD

The illustrative embodiments generally relate to an apparatus and method for paging mobile devices.

BACKGROUND

U.S. Pat. No. 8,024,487 discloses a system and method for discovering and connecting to a preferred remote Bluetooth device by a local Bluetooth device. An inquiry scan cache and a page scan cache are maintained. The inquiry scan cache is updated by way of a periodic inquiry scan. The page scan cache is refreshed by way of an attempt to connect to the preferred remote Bluetooth device. Periodically, and more frequently than the periodic inquiry scan, a list of available remote Bluetooth devices is formed from entries in the inquiry scan cache concatenated with each entry in the page scan cache for which a page scan is successful. In one embodiment, the page scan cache holds a finite number of entries, and an expiration policy is applied to each added entry. In another embodiment, the inquiry scan cache is also updated when a remote Bluetooth device attempts to connect to the local Bluetooth device.

U.S. Pat. No. 7,516,201 discloses a communication device and a software for operating multimedia applications in one or more communication networks, with a computing manager unit for managing and providing multimedia applications on the basis of a communication with one or more communication devices in the one or more communication networks, whereby the computing manager unit controls a device discovery manager unit for detecting the availability of one or more devices and/or one or more communication networks, a service discovery manager unit for providing available services from and/or for said one or more communication networks, and a virtual device manager unit providing a graphical user interface for controlling devices and/or services of the one or more communication networks.

SUMMARY

A first illustrative embodiment includes a vehicle computer system (VCS) configured to communicate with one or more mobile devices, comprising a first processor configured to automatically create a priority list by utilizing one or more factors associated with communication activity between the vehicle computer system and the one or more mobile devices, wherein the priority list includes instructions to pair one or more mobile devices with the VCS and indicates the order of connecting to the one or more mobile devices. The vehicle computer system also includes a wireless transceiver including a second processor configured to receive the priority list from the first processor and establish a wireless connection with one or more mobile devices based on the priority list.

A second illustrative embodiment includes a vehicle computer system (VCS) comprising a processor configured to automatically create a priority list by utilizing one or more factors associated with wireless pairing activity between the VCS and mobile-devices, wherein the priority list indicates the order of connecting to the mobile-devices and a number of attempts for each of the mobile-devices to connect with the VCS before timing out and connect with a first mobile-device based on the priority list.

A third illustrative embodiment includes a vehicle computer system (VCS) configured to communicate with one or more mobile devices comprising a processor configured to automatically create a priority list by utilizing one or more factors associated with communication activity between the vehicle computer system and the one or more mobile devices, wherein the priority list includes instructions to pair one or more mobile devices with the VCS and indicates the order of connecting to the one or more mobile devices and establish a wireless connection with one or more mobile devices based on the priority list.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
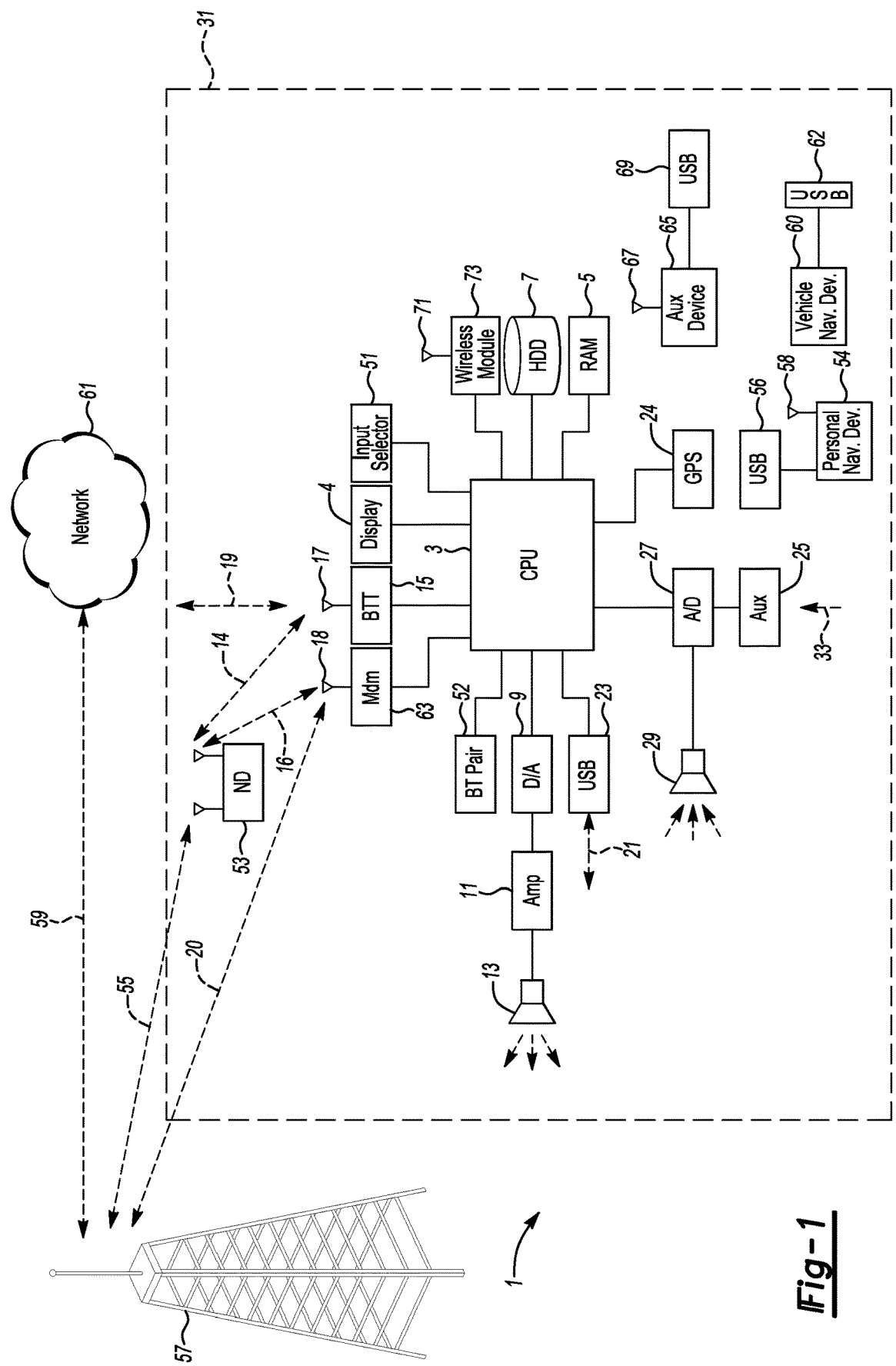
FIG. 1 illustrates an example block topology for a vehicle based computing system (VCS) for a vehicle.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, spoken dialog system with automatic speech recognition and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory. In general, persistent (non-transitory) memory can include all forms of memory that maintain data when a computer or other device is powered down. These include, but are not limited to, HDDs, CDs, DVDs, magnetic tapes, solid state drives, portable USB drives and any other suitable form of persistent memory.

The processor is also provided with a number of different inputs allowing the user to interface with the processor. In this illustrative embodiment, a microphone 29, an auxiliary input 25 (for input 33), a USB input 23, a GPS input 24, screen 4, which may be a touchscreen display, and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous of the vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device can then be used to communicate 59 with a network 61 outside the vehicle 31 through, for example, communication 55 with a cellular tower 57. In some embodiments, tower 57 may be a WiFi access point.

Exemplary communication between the nomadic device and the BLUETOOTH transceiver is represented by signal 14.

Pairing a nomadic device 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include WiFi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of Code Domain Multiple Access (CDMA), Time Domain Multiple Access (TDMA), Space-Domain Multiple Access (SDMA) for digital cellular communication. These are all ITU IMT-2000 (3G) compliant standards and offer data rates up to 2 mbs for stationary or walking users and 385 kbs for users in a moving vehicle. 3G standards are now being replaced by IMT-Advanced (4G) which offers 100 mbs for users in a vehicle and 1 gbs for stationary users. If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., WiFi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (FireWire™ (Apple), i.LINK™ (Sony), and Lynx™ (Texas Instruments)), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a WiFi (IEEE 803.11) 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing the process, since the wireless device would not "send and receive" information with itself. One of ordinary skill in the art will understand when it is inappropriate to apply a particular VACS to a given solution. In all solutions, it is contemplated that at least the vehicle computing system (VCS) located within the vehicle itself is capable of performing the exemplary processes.

Figure 2:
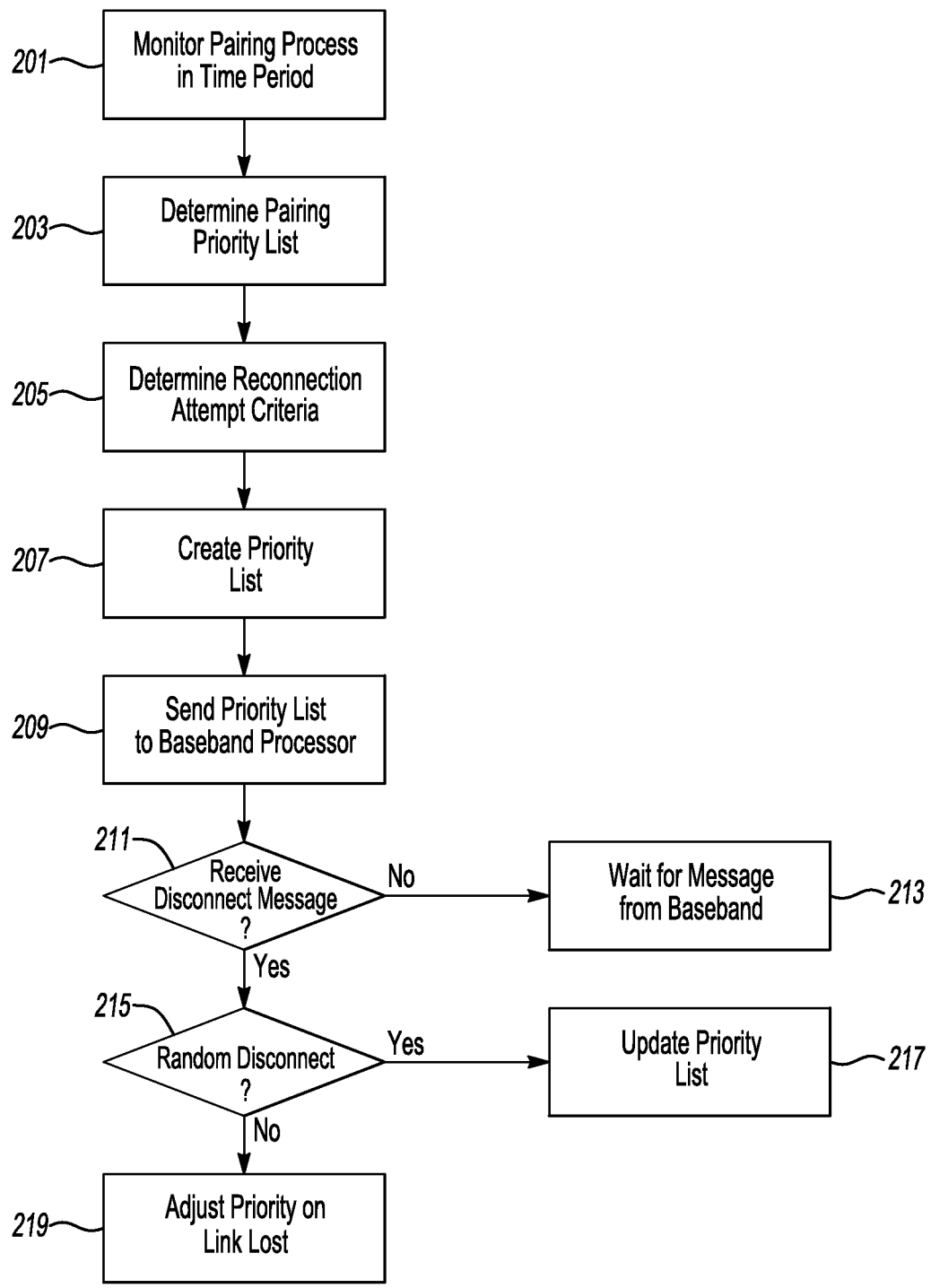
FIG. 2 illustrates an example flow chart of the vehicle based computing system and wireless transceiver pairing with a mobile device.

FIG. 2 illustrates an example flow chart of the vehicle based computing system and wireless transceiver pairing with a mobile device. In one embodiment, the processor and VCS may be able to pair multiple devices. The processor may monitor the pairing process between the vehicle computer system and mobile devices within a specific time period 201, such as a day, week, month, several months, etc. By monitoring the activity between the vehicle computer system and mobile devices which pair or attempt to pair with the VCS, the process may understand certain habits or preferences of each user or device. Additionally, the system may keep track of various circumstances or instances, such as the favorite phone set by a user, the last connected device, the second to last connected device, the device connected the most during a time period (e.g. one week, two weeks, one month, etc.), the device connected the most for that specific day (e.g. certain device connected the most on each Monday or weekend), the device connected the most considering the time of day (morning, afternoon, evening), devices that are randomly disconnected and how often they are reconnected, etc. Based on the number of devices paired, the process may determine the most important devices amongst the list and utilize a priority list.

Figure 3:
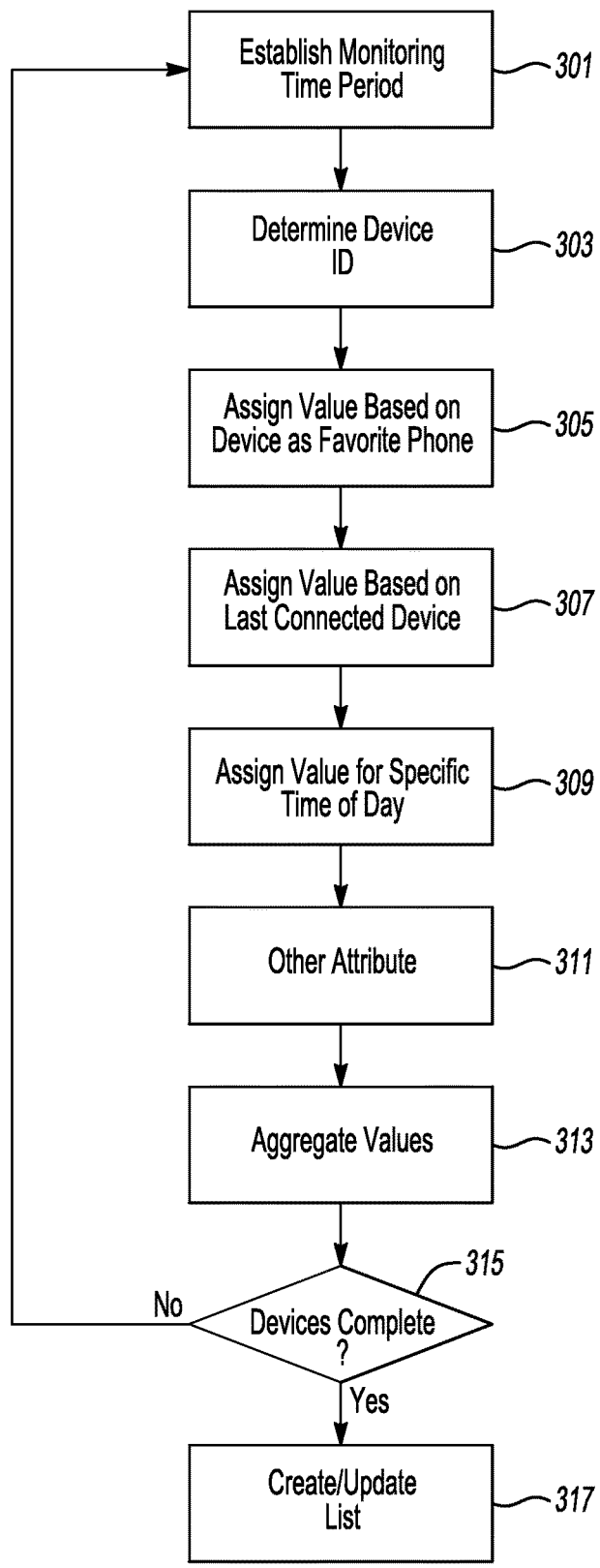
FIG. 3 illustrates an example flow chart of a vehicle based computing system (VCS) monitoring connection activity to create a priority list.

For example, if twelve devices have been paired with the system, the processor may group the top half (e.g. six devices) or top quarter (e.g. three devices). Or in another example, the grouping may consider the five most important devices based on the metrics described above, the second set of the five most important devices, and the last two devices. Based on the grouping, the processor may establish a certain connection pattern for that specific group. FIG. 3 may provide an example of the attributes used to create an exemplary priority list.

The processor may create a priority list for the baseband wireless transceiver or another processor to establish the connection method between the baseband wireless transceiver and the mobile device 203. The VCS may also determine the reconnection attempt criteria 205 by utilizing the same attributes used to create or update the priority list. For example, each device may have a unique wireless connection retry mechanism (e.g. the most used or favorite phone contains the most attempts before timing out, least favorite phone uses the least attempts). In another example, each grouping of the device may have a unique wireless connection retry mechanism (e.g. the five most important mobile devices utilize the most attempts before timing out, the second group of five most important mobile devices utilize less connection attempts before timing out, the two devices that are perceived as the least important are skipped or ignored). Any number of mechanisms may be used based on the metrics above to prioritize the connection or attempted connection sequence for connecting to each device. The processor may send a message to another processor containing the priority list for the paired mobile devices that specifies the connection retry mechanism for each specific device and/or for each grouping. Although the embodiments described below may illustrate that the baseband performs the processing for instructing the wireless transceiver to connect with the wireless device, the VCS processor may operate on its own to connect the mobile devices, or another processor may be used.

In one embodiment, the processor may create a list 207 based on the first five devices following an ignition on cycle by prioritizing the devices most used during this period of day, the last connected phone, most used during the day during the week, the second to last connected phone, most used during the week, and the favorite phone as set by the user. For each of the metrics above, the processor may assign a value for each device. For example, the last connected phone may receive an arbitrary value of 5, while the second to last connected phone receives a value of 4. Each specific criteria or circumstance may receive a value when determining the final priority list. Additionally, each metric or criteria may be utilized to establish a value of connection attempts during a connection failure for each device. For example, the CPU may determine that the highest priority mobile device attempt a connection five times before timing out, but the mobile device with the lowest priority may attempt a connection only once before timing out.

The CPU of the VCS may then send the priority list to the baseband processor 209 or any other vehicle processor. In one embodiment, the baseband wireless transceiver may go through each of the first group of devices (e.g. group of five devices) one time in a loop. If a connection is not established during the second round, the baseband processor may attempt to try to connect to each device more often than the other device based on a retry number in the message sent to the baseband from the CPU. The CPU may determine the connection retry number based on the frequency of the metrics, as stated above.

The CPU may then determine if it receives a disconnect message 211 from the mobile device or another processor, such as the base-band processor. The CPU may stay active in waiting for a disconnect message if nothing is received 213. However, if the CPU receives a disconnect message, it may analyze the type of disconnect message it has received. For example, the CPU may determine if the disconnect is a random disconnect 215 by the message. If the disconnect is random, it may update the priority list 217 to reflect the mobile device's disconnect. For instance, if the phone is randomly disconnected, the phone will send a message to the base-band processor or to the CPU directly. Upon receiving the disconnect message, the CPU will update the priority list to reflect the random disconnect for that specific mobile device. This may adjust the priority of the mobile device or the connection attempts for that mobile device. If the CPU determines that the disconnect is not a random disconnect, it may adjust the prioritization based on the link loss 219.

If the baseband detects a linkloss and the CPU also detects a door open signal and/or the phone disconnect, the CPU may provide a list to the baseband processor of other phones to connect. The baseband-processor or CPU may successfully connect with another phone. However, the baseband-processor or CPU may still utilize an Asynchronous Connection-Less (ACL) Link to attempt to connect the disconnected phone. The CPU shall adjust the priority of the list in a manner to make the disconnected phone as a part of a PICONET, rather than attempt a reconnection and/or reset the list. If the connection is formed toward one of the other phones, then the baseband shall keep on paging the device that was disconnected for a specific time period (e.g. 15 minutes) utilizing an ACL link. If the device does become part of the PICONET, then baseband shall inform the CPU that it found the device. The CPU may be able to determine if it wants to switch to that specific device based on whether it is the favorite phone, a high priority phone, or any of the other criteria mentioned above.

One example of this use-case may include a husband and wife driving together with Bluetooth mobile phones that have been paired with the VCS. The husband's phone may be paired with the vehicle. However, the husband may go into a convenience store and lose a Bluetooth connection with the VCS and wireless transceiver. The VCS may then search for the next device to pair, and connect with the wife's Bluetooth phone. However, rather than ignore the disconnect that occurred with the husband's phone, the system may continuously page the husband's phone for a time period of 10 minutes utilizing the ACL link. If the husband returns within that time period, the VCS will pair with the husband's phone and disconnect the wife's phone. However, if the husband does not return to the vehicle within the 10 minute time period, the VCS will stay paired with the wife's phone and stop paging the husband's mobile device.

FIG. 3 illustrates an example flow chart of a vehicle based computing system (VCS) aggregating a priority list to be used with mobile devices. The VCS processor may keep track of the pairing process between the vehicle computer system and mobile devices within a specific time period, such as a day, week, month, several months, etc. Upon determining the specific time period to be used to monitor the activity between the VCS and a mobile device 301, the VCS may begin to monitor the mobile activity for that given period.

During the pair process, the VCS may determine the identification of a device interacting with the VCS 303. The VCS may identify the device by an associated name of the device, a Bluetooth address, a unique identifier, or by utilizing an application on the mobile phone. Additionally, the VCS may utilize other associated vehicle components for identifying a device or a user of the device, such as the key fob, seat settings, GPS location (e.g. devices used in a specific location), etc. Upon identifying the device, the VCS may begin to monitor the activity of the device for a given time period or instance.

The VCS may assign a value for a device based on whether the mobile device is selected as a "Favorite Phone" 305, which may be a setting utilized by the human machine interface (HMI) of the VCS. In one example, a system may assign a value for a device that is a favorite phone, but a value of zero for any device that is not selected as a favorite phone. This value may be used in creating the priority list for the mobile devices. Additionally, the value may be utilized in determining the reconnection attempts for that specific device.

In determining the priority list, each connectivity attribute, such as whether the device is a favorite phone, may be given a certain weight in factoring the final outcome of the priority list and/or reconnection strategy. For example, the "Favorite Phone" attribute may be the most important attribute and be the most important factor when determining the priority of the list, but the last connected phone attribute may be the least important factor. The VCS may be preset with a specific factor for each attribute, or the user may set the factors through the HMI.

The VCS may also assign a value for a device based on whether the mobile device is the last connected device 307. For example, the system may determine the device identification of the last device to pair with the VCS. That device may be assigned a value that increases the importance of that device on the priority list. In another example, if a device was not the last device paired, a value of zero may be utilized for that device. The system may also be configured to look at the pairing history of all previous devices and assign a value based on the pairing history for any number of devices. Additionally, the value associated with that device may be utilized in determining the reconnection attempts for that specific device.

The VCS may also assign a value for a device based on the time of day 309. For example, the user may attempt to pair a device on a Monday. The system may look back at the connectivity history of devices that have paired or interacted with the system for any number of previous Mondays of the system. The device may be assigned a value for each instance that it was paired or had any activity with the VCS for that specific day. Additionally, the system may look back at previous Mondays and assign a higher value if the device was used on previous Mondays. Any time period or specific instance of time may be used, as previously described. The system may also be configured to look at the pairing history of all previous devices for that time period and assign a value based on the pairing history for any number of devices. Additionally, the value associated with that device may be utilized in determining the reconnection attempts for that specific device.

Any number of attributes may be utilized in creating or updating the priority list 311. The attributes may include other items such as location, seat setting, or utilizing other associated vehicle components for assigning a value of the priority list. For example, the VCS may recognize a Bluetooth phone and a primary key fob, thus assigning a higher value for that mobile device than a Bluetooth phone being associated with a valet key or a secondary key fob. A multitude of other factors may be used that include other metrics of communication activity between the mobile device and the VCS, including a specific route the vehicle is on, the season (e.g winter, summer, etc), number of occupants (e.g. all occupant sensors are activated in the vehicle because a certain driver typically drives with all children), etc.

Upon collecting all values that are associated with the different mobile devices, the system may aggregate all of the values 313. When aggregating the values, the system may also include different factors for each attribute to increase the weight of importance for specific attributes. For example, although the value may be the same for each attribute, the value that is utilized for the "favorite mobile device" may be factored for additional weight of importance for that specific mobile device. Any of the different attributes may be increased or decreased by a specific factor based on an infinite amount of calculations. The vehicle manufacturer may tune the factors. Additionally, a user setting may allow the user to specify each of the attributes weight when aggregating the values.

The VCS may determine if any additional devices must be valued and aggregated before creating or updating the list 315. If additional devices need to be analyzed, the system may establish the time period for monitoring that device at step 301. However, upon completion and verification of all devices, the system may then begin to create or update the priority list.

The VCS may create and update the list 317 upon completion of analyzing the devices. The system may create the list by tallying all of the aggregated values. The system may then prioritize certain mobile devices based on the values associated with the list. Thus, the mobile device deemed to be the most important or most frequently used device may be on top of the priority list. Thus, the VCS or wireless transceiver may seek to establish a connection with this device first. Additionally, the system may assign the amount of connection attempts for each device when creating the list. For example, the system may determine the most important device needs to be pinged 5 times for a connection before timing out and continuing to the next device on the priority list. Any amount of connection attempts can be associated with each device and may vary amongst the devices on the list.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle computer system (VCS) configured to communicate with one or more mobile devices, comprising:
a first processor configured to automatically create a priority list by utilizing one or more factors associated with communication activity between the vehicle computer system and the one or more mobile devices, wherein the priority list includes instructions to pair one or more mobile devices with the VCS and indicates an order of connecting to the one or more mobile devices; and a wireless transceiver including a second processor configured to: receive the priority list from the first processor; establish a wireless connection with one or more mobile devices based on the priority list;
wherein the one or more factors include whether the one or more mobile devices are connected most frequently during a time period.

2. The vehicle computer system configured to communicate with a mobile device of claim 1, wherein the time period is one week.

* * * * *